(12) United States Patent
Leem et al.

(10) Patent No.: US 10,026,048 B2
(45) Date of Patent: Jul. 17, 2018

(54) METHOD AND SYSTEM FOR PROCESSING DATA FROM EQUIPMENT

(71) Applicant: Samsung Electronics Co., Ltd., Suwon-si, Gyeonggi-do (KR)

(72) Inventors: Chang-Ryul Leem, Hwaseong-si (KR); Uiseok Kume, Seongnam-si (KR); Jung-Hyuk Park, Suwon-si (KR); Dong-Hwan Chung, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 626 days.

(21) Appl. No.: 14/676,116

(22) Filed: Apr. 1, 2015

(65) Prior Publication Data
US 2016/0034836 A1  Feb. 4, 2016

(30) Foreign Application Priority Data
Jul. 30, 2014  (KR) .................. 10-2014-0097532

(51) Int. Cl.
  *G06Q 10/00* (2012.01)
  *G06Q 10/06* (2012.01)
  *G06Q 50/04* (2012.01)
(52) U.S. Cl.
  CPC ....... *G06Q 10/06314* (2013.01); *G06Q 50/04* (2013.01); *Y02P 90/30* (2015.11)
(58) Field of Classification Search
  CPC .... G06Q 10/06314; G06Q 50/04; Y02P 90/30
  See application file for complete search history.

(56) References Cited

U.S. PATENT DOCUMENTS 5,040,123 A * 8/1991 Barber ............ G05B 19/41865
                                                 700/100
6,721,618 B2    4/2004 Baek et al.
(Continued)

FOREIGN PATENT DOCUMENTS

KR    10-1998-0073261 A    11/1998
KR    10-1999-0085705 A    12/1999
(Continued)

*Primary Examiner* — Sujay Koneru
(74) *Attorney, Agent, or Firm* — Harness, Dickey & Pierce, P.L.C.

(57) ABSTRACT

Systems and methods of processing equipment information obtained from a plurality of equipment includes obtaining equipment information from the plurality of equipment; standardizing the equipment information such that the equipment information conforms to a desired format, the standardizing including generating practical information and associated information based on the standardized equipment information, the practical information indicating an operation state of each of the plurality of equipment, and the associated information being information about the practical information; aggregating the standardized equipment information the aggregating being based on a prediction of an amount of equipment information to be produced during a desired period of time; objectifying the aggregated equipment information to generate analysis information; and performing a reverse schedule operation to reconfigure the analysis information into a unit schedule based on an information classification table.

20 Claims, 7 Drawing Sheets

(56) References Cited

U.S. PATENT DOCUMENTS

| | | | |
|---|---|---|---|
| 7,668,614 B2* | 2/2010 | Govind | G05B 19/41865 700/100 |
| 8,112,400 B2 | 2/2012 | Ouyang et al. | |
| 2003/0208294 A1 | 11/2003 | Cheng et al. | |
| 2004/0059451 A1* | 3/2004 | Holtan | G05B 19/41865 700/100 |
| 2005/0203655 A1* | 9/2005 | Tsai | G05B 19/41865 700/101 |
| 2006/0256727 A1* | 11/2006 | Acharya | H04J 3/085 370/244 |
| 2006/0265261 A1* | 11/2006 | Wetzer | G05B 23/0283 705/7.18 |
| 2007/0010905 A1 | 1/2007 | Chou | |
| 2008/0091289 A1* | 4/2008 | Gozzi | G06Q 10/06 700/100 |
| 2008/0154421 A1 | 6/2008 | Chang et al. | |
| 2009/0024689 A1 | 1/2009 | Kim et al. | |
| 2009/0327511 A1 | 12/2009 | Kim et al. | |
| 2012/0124066 A1 | 5/2012 | Chen et al. | |
| 2012/0278121 A1* | 11/2012 | Bateman | G06Q 10/06311 705/7.22 |
| 2014/0028466 A1* | 1/2014 | Tsai | G01D 4/002 340/870.02 |
| 2014/0031956 A1* | 1/2014 | Slessman | G05B 13/02 700/28 |
| 2015/0046363 A1* | 2/2015 | McNamara | G06Q 10/0635 705/333 |
| 2015/0105887 A1* | 4/2015 | Troy | G05B 19/41865 700/97 |

FOREIGN PATENT DOCUMENTS

| | | |
|---|---|---|
| KR | 10-2001-0108783 A | 12/2001 |
| KR | 10-2004-0052880 A | 6/2004 |
| KR | 10-2009-0054242 A | 5/2009 |
| KR | 10-2010-0048398 A | 5/2010 |

* cited by examiner

METHOD AND SYSTEM FOR PROCESSING DATA FROM EQUIPMENT

CROSS-REFERENCE TO RELATED APPLICATIONS

A claim for priority under 35 U.S.C. § 119 is made to Korean Patent Application No. 10-2014-0097532 filed Jul. 30, 2014, in the Korean Intellectual Property Office, the entire contents of which are hereby incorporated by reference.

BACKGROUND

The inventive concepts described herein relate to a method of processing equipment information from a plurality of equipment and using the processed result.

Many efforts are under way to improve productivity by means of equipment information that is produced from equipment items used during a semiconductor fabrication process. Also, since protocols of semiconductor equipment made by manufacturers are different from each other, many efforts are under way to conduct smooth communications among the equipment and/or between the equipment and a host device.

The Semiconductor Equipment and Materials International (SEMI) is a trade association of semiconductor manufacturers that makes rules, protocols, procedures, and/or standards for communications between semiconductor equipment. The SEMI rules may include protocols including the following SEMI Equipment Communications Standard (SECS), High-speed SECS Message Services (HSMS), and Generic Equipment Model (GEM). The SECS may include SECS-I and SECS-II.

The rules define procedures and/or protocols for communications between the semiconductor equipment and one or more host devices. The rules define physical interconnection, signal levels, data speed, and logical protocols that are required for information exchange between a host and manufacture equipment.

Semiconductor fabrication may include many processes and a lot of equipment may be used to implement the various semiconductor fabrication processes. However, problems may arise if process information not defined by the SECS is acquired at an end of each process, and the acquired information is used as analysis information. A lot of equipment information that semiconductor equipment generates during a fabricating processor may be differently collected due to different formats of equipment manufacturers, etc., thereby causing problems with reliability and compatibility. Thus, many semiconductor manufacturers desired a system that classifies equipment information into a fixed format in order to apply equipment information to one or more processes.

SUMMARY

At least one example embodiment relates to a method of processing equipment information obtained from a plurality of equipment.

According to an example embodiment, method of processing equipment information obtained from a plurality of equipment includes obtaining, by a processor, equipment information from the plurality of equipment; standardizing, by the processor, the equipment information such that the equipment information conforms to a desired format, the standardizing including generating practical information and associated information based on the standardized equipment information, the practical information indicating an operation state of each of the plurality of equipment, and the associated information being information about the practical information; aggregating, by the processor, the standardized equipment information the aggregating being based on a prediction of an amount of equipment information to be produced during a desired period of time; objectifying, by the processor, the aggregated equipment information to generate analysis information; and performing a reverse schedule operation to reconfigure the analysis information into a unit schedule based on an information classification table.

At least one example embodiment provides that the equipment information comprises (i) information associated with status changes in each of the plurality of equipment, and (ii) information not associated with the status changes; and the information associated with status changes in each of the plurality of equipment includes at least one of information associated with management of each of the plurality of equipment, information generated in conjunction with an outside of the plurality of equipment, and information generated due to at least one defective equipment.

At least one example embodiment provides that the equipment information is classified within the information classification table according to a Mutually Exclusive and Collectively Exhaustive (MECE) rule such that each element of the information classification table is mutually exclusive and collectively exhaustive from each other element in the information classification table.

At least one example embodiment provides that the practical information comprises (i) information to be recorded according to the information classification table, and (ii) a value of the information to be recorded.

At least one example embodiment provides that the associated information comprises at least one of (i) information associated with generation of the practical information, (ii) information associated with a target material described by the practical information, and (iii) additional information associated with the practical information.

At least one example embodiment provides that wherein the standardized equipment information comprises at least one of (i) information associated with a category defined by the information classification table, and (ii) information associated with a point in time at which the standardized equipment information is generated.

At least one example embodiment provides that the method further includes storing the standardized equipment information in a storage device associated of a corresponding one of the plurality of equipment before the collecting, and each storage device is accessible from an external device through the network.

At least one example embodiment provides that the objectifying the collected equipment information includes determining whether the equipment information corresponds to the desired format; storing the equipment information in a temporary storage device in as partial information when the equipment information is determined to correspond to the desired format; and storing the analysis information generated by gathering the partial information in the temporary storage device.

At least one example embodiment provides that the performing the reverse schedule operation includes classifying the analysis information according to the information classification table; configuring the classified analysis information into the unit schedule; and determining whether a missing block exists within the unit schedule by comparing the configured analysis information with other unit schedules.

At least one example embodiment provides that the method further includes generating expected information associated with the missing block when the missing block is determined to exist.

At least one example embodiment relates to a system for processing equipment information.

According to at least one example embodiment, a system includes a plurality of application servers and a main server. A processor of one of a plurality of application servers is configured to standardize equipment information collected from a plurality of equipment such that the equipment information conforms to a desired format, the standardizing including generating practical information and associated information, the practical information indicating an operation state of each of the plurality of equipment, the associated information being information about the practical information. The main server configured to obtain fundamental information of each of the plurality of equipment, the fundamental information including identification information used to identify each of the plurality of equipment, the main server obtaining the fundamental information from a host device, and calculate a prediction of an amount of the equipment information to be produced during a desired period of time. At least one application server of the plurality of application servers configured to collect the standardized equipment information through a network based on the prediction of the amount of the standardized equipment information to be produced during a period of time, objectify the collected equipment information to generate analysis information, and perform a reverse schedule operation for configuring the analysis information into a unit schedule based on an information classification table.

At least one example embodiment provides that the equipment information comprises (i) information associated with a status change in the plurality of equipment, and (ii) information not associated with the status changes, and the information associated with the status change in the plurality of equipment comprises at least one of (i) information associated with management of the plurality of equipment, (ii) information generated through conjunction with an outside of the plurality of equipment, and (iii) information generated due to at least one defective equipment.

At least one example embodiment provides that the main server is configured to store, in a storage device associated with the main server, the information classification table and the reverse scheduled analysis information.

At least one example embodiment provides that the practical information comprises information to be recorded based on the information classification table and a value of the information to be recorded.

At least one example embodiment provides that the associated information comprises at least one of (i) information associated with generation of the practical information, (ii) information associated with a target material corresponding to the practical information, and (iii) additional information associated with the practical information.

At least one example embodiment relates to a server for processing equipment information.

According to an example embodiment, a server a non-transitory computer readable medium configured to store program code; and a processor configured to execute the program code to obtain equipment information from the plurality of equipment; standardize the equipment information such that the equipment information conforms to a desired format, the standardizing including generating practical information and associated information based on the standardized equipment information, the practical information indicating an operation state of each of the plurality of equipment, the associated information being information about the practical information; aggregate the standardized equipment information, the aggregating being based on a prediction of an amount of equipment information to be produced during a desired period of time; generate analysis information based on the aggregated equipment information; and reconfigure the analysis information into a unit schedule based on an information classification table.

At least one example embodiment provides that the equipment information comprises (i) information associated with status changes in each of the plurality of equipment, and (ii) information not associated with the status changes, and the information associated with status changes in each of the plurality of equipment includes at least one of information associated with management of each of the plurality of equipment, information generated in conjunction with an outside of the plurality of equipment, and information generated due to at least one defective equipment.

At least one example embodiment provides that the processor is further configured to execute the program code to store the standardized equipment information in another storage device associated of a corresponding one of the plurality of equipment before the collecting, and each storage device is accessible by an external device through the network.

At least one example embodiment provides that in the generating the analysis information, the processor is configured to execute the program code to determine whether the equipment information corresponds to the desired format; store the equipment information in a temporary storage device in as partial information when the equipment information is determined to correspond to the desired format; and store the analysis information generated by gathering the partial information in the temporary storage device.

At least one example embodiment provides that in the reconfiguring, the processor is configured to execute the program code to classify the analysis information according to the information classification table; configure the classified analysis information into the unit schedule; and determine whether a missing block exists within the unit schedule by comparing the configured analysis information with other unit schedules.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
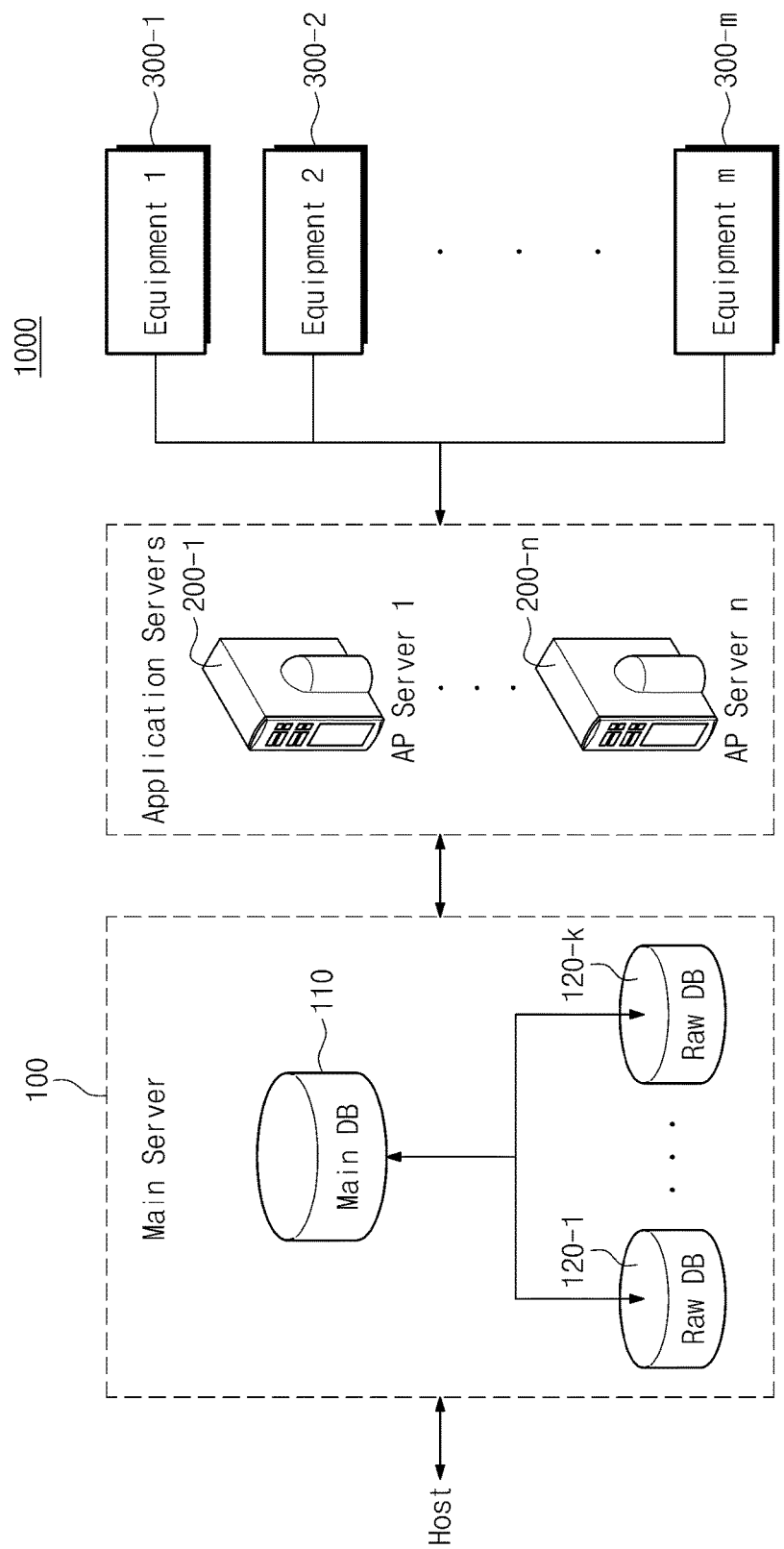
FIG. 1 is a block diagram schematically illustrating a data processing system according to an example embodiment of the inventive concepts.

Embodiments will be described in detail with reference to the accompanying drawings. The inventive concepts, however, may be embodied in various different forms, and should not be construed as being limited only to the illustrated example embodiments. Rather, these embodiments are provided as examples so that this disclosure will be thorough and complete, and will fully convey the concept of the inventive concepts to those skilled in the art. Accordingly, known processes, elements, and techniques are not described with respect to some of the embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a data processing system according to an example embodiment of the inventive concepts. Referring to FIG. 1, a system 100 contains a main server 100, a plurality of application servers 200-1 through 200-$n$ (also referred to as the "applications severs 200"), and a plurality of equipment 300-1 through 300-$m$ (also referred to as the "equipment 300").

The main server 100 and the application servers 200 are network elements that may include one or more devices, systems, and/or applications for providing one or more services to client devices (e.g., equipment 300). Main server 100 and application servers 200 may include one or more processors, memory or computer readable storage medium, and a network interface. In some embodiments, main server 100 and application servers 200 may include a transmitter/receiver connected to one or more antennas. The main server 100 and application servers 200 may be any network element capable of receiving and responding to requests from one or more client devices (e.g., equipment 300) across a computer network (e.g., communication network 400) to provide one or more services. Accordingly, main server 100 and application servers 200 may be configured to communicate with the equipment 300 via a wireless protocol. Additionally, main server 100 and/or application servers 200 may be a single physical hardware device, or main server 100 and/or application servers 200 may be physically or logically connected with other network devices, such that the main server 100 and/or application servers 200 may reside on one or more physical hardware devices. Main server 100 and application servers 200 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). Main server 100 and application servers 200 may be configured to establish, manage, and terminate communications sessions, for example between the main server 100 and the equipment 300, between application servers 200 and the equipment 300, between the host and the equipment 300, the host and the application servers 200, between main server 100 and application servers 200, and the like. Main server 100 and application servers 200 may also be configured to establish, manage, and terminate communications sessions with two or more devices. According to various embodiments, the host, the equipment 300, the application servers 200, and the main server 100 may communicate with each other via a communications network.

As discussed above, main server 100 and application servers 200 may include one or more processors (not shown) and one or more data storage devices (not shown). The one or more processors may be special purpose computer processing devices configured to carry out program code stored in the one or more storage devices by performing arithmetical, logical, and input/output operations. For example, program code, software units, and/or software modules may be loaded into the one or more processors. Once the program code and/or software modules are loaded into the one or more processors, the one or more processors may be configured to perform operations according to various example embodiments.

The one or more storage devices may be a computer readable storage medium that generally includes a random access memory (RAM), read only memory (ROM), a permanent mass storage device (such as a disk drive), and/or any other like data storage mechanism capable of storing and recording data. The one or more storage devices may be configured to store program code for one or more operating systems and/or program code for one or more software components and/or modules for performing operations according to various example embodiments. These software components may also be loaded from a separate computer readable storage medium into the one or more storage devices and/or the one or more processors using a drive mechanism (not shown). Such separate computer readable storage medium may include a floppy drive, disc, tape, Blu-ray/DVD/CD-ROM drive, memory card, removable flash memory drive, and/or other like computer readable storage medium (not shown). In some embodiments, software components may be loaded into the one or more storage devices and/or the one or more processors from a remote data storage device via a network interface, rather than via a computer readable storage medium.

Main server 100 and application servers 200 may also include a transmitter and receiver. The transmitter and receiver may be any type of hardware device that generates or otherwise produces radio waves in order to communicate with one or more other devices. The transmitter and receiver may be coupled with an antenna (not shown) in order to transmit data to one or more other devices. The transmitter and receiver may be configured to receive digital data from one or more components of main server 100 and application servers 200, and convert the received digital data into an analog signal for transmission over an air interface. The transmitter and receiver may be any type of hardware device that can receive and convert a signal from a modulated radio wave into usable information, such as digital data. The transmitter and receiver may be coupled with the antenna (not shown) in order to capture radio waves. The transmitter and receiver may be configured to send digital data converted from a captured radio wave to one or more other components of main server 100 and application servers 200. Main server 100 and application servers 200 may include a transceiver (not shown) instead of transmitter and receiver, where the transceiver is a single component configured to provide the functionality of a transmitter and a receiver as discussed above. The wireless transmitter/receiver and/or transceiver may be configured to operate in accordance with one or more wireless communications protocols and/or one or more cellular phone communications protocols. Main server 100 and application servers 200 may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, Long Term Evolution (LTE), an email protocol such as Internet Message Access Protocol (IMAP) and/or Post Office Protocol (POP), an instance messaging such as eXtensible Messaging and Presence Protocol (XMPP), Session Initiation Protocol for Instant Messaging and Presence Leveraging Extensions (SIMPLE), Instant Messaging and Presence Service (IMPS), and Short Message Service (SMS), or any other "wireless" communication protocols, including RF-based, optical (visible/invisible), and so forth.

According to various embodiments, the main server 100 and the application servers 200 may be connected to one or more local and/or remote databases (e.g., main database (DB) 110 and raw DB 120-1 through raw DB 120$k$). In various embodiments, the one or more databases may include a database management system ("DBMS"), a relational database management system ("RDBMS") database, an object database ("ODBMS"), column-oriented DBMS, correlation database DBMS, and/or other like database management systems. In various embodiments, the one or more databases may be used by the main server 100 and/or the application servers 200 to store and record data. The main database 110 may be a database implemented to store and/or record equipment information and/or other like processed data. The raw DBs 120 may be databases implemented to store and/or record raw data, such as data that is collected from a source (e.g., equipment 300). The collected raw data may be in un-standardized formats, unverified, non-coded or unformatted. Once captured, the raw data may be processed and stored in the main DB 110.

Furthermore, in some embodiments, the main server 100 and/or the application servers 200 may include many more components than those discussed above, such as a display device, a network interface, and/or other like physical hardware components. However, it is not necessary that all of these generally conventional components be disclosed in order to disclose the example embodiments.

The main server 100 receives fundamental information, such as an IP addresses of the plurality of equipment 300-1 through 300-$m$ and/or any other like identification information used to identify each of the plurality of equipment 300, from a host device. The main server 100 calculates or otherwise predicts an amount of equipment information that each of the plurality of equipment 300-1 through 300-$m$ will generate during a desired time period (or alternatively, "per unit time") based on complicity of each of the plurality of equipment 300-1 through 300-$m$. For example, information generated by the plurality of equipment 300-1 through 300-$m$ may include a variety of information associated with product manufacture. The main server 100 allocates equipment information that the application servers 200-1 through 200-$n$ collect based on the amount of practical information that each of the plurality of equipment 300-1 through 300-$m$ creates during a unit time (e.g., a day or a week). The practical information may indicate operation states of the equipment 300, information regarding materials that are used by an equipment 300, operation error and/or failure information associated with an equipment 300, and the like.

In various embodiments, the main server 100 may allocate equipment information for each of the application servers 200-1 through 200-n to collect based on one or more information and/or data types, sets, categories, and/or according to any other like grouping of information generated by one or more of the equipment 300.

The application servers 200-1 through 200-n collect equipment information created by the plurality of equipment 300-1 through 300-m and provide the collected equipment information to the main server 100. The application servers 200-1 through 200-n make a reverse schedule (or alternatively "perform reverse scheduling" and/or perform a "reverse scheduling operation") in which the collected equipment information is standardized in compliance with a desired standard format. The reverse scheduling also includes (re)configuring the equipment information into a unit schedule in compliance with the desired standard. The unit schedule may denote a combination of discrete hardware operations of one or more of the plurality of equipment 300 that are desired to be performed during each operation and/or stage of production. Reverse scheduling may refer to any process of determining a production schedule by working backwards from a completion time and/or date to a start time and/or date, including a determination of an amount of materials and types of materials to be used during each operation and/or stage of production. Reverse scheduling may also include a determination of a period of time (or alternatively "unit of time" or "unit time") desired for performing each operation and/or stage of production. The equipment may include a plurality of hardware and a plurality of hardware operations, such as carrying a wafer, opening and closing a chamber, inserting a wafer into a chamber, returning the wafer to another component or device, and the like.

The plurality of equipment 300-1 through 300-m may be connected to the plurality of application servers 200-1 through 200-n through a communications network. The plurality of equipment 300-1 through 300-m may be fabrication equipment for a semiconductor fabricating process. For example, the equipment 300 may include a bubble cylinder, a burn-in oven, a coordinatograph, a device under test (DUT) device, a High Speed Rotary Bonders (HRB), a photomask, a Standard Mechanical Interface (SMIF), and/or any other like semiconductor fabrication equipment or devices.

Each of the plurality of equipment 300-1 through 300-m may contain one or more storage devices and/or memory devices, which may be used to store a variety of information generated during a fabricating process. The one or more memory devices are a hardware devices configured to store an operating system (OS), program code for one or more software components, and/or semiconductor fabrication information. The one or more memory devices may be a computer readable storage medium that generally includes a random access memory (RAM), read only memory (ROM), a flash memory device, a solid state disk (SSD), and/or other like storage media capable of storing and recording data. According to various example embodiments, the variety of semiconductor fabrication information may be generated by each of the plurality of equipment 300 in compliance with the standard format, and the standardized semiconductor fabrication information may be stored in a corresponding storage device and/or memory device for each of the plurality of equipment 300.

According to an embodiment of the inventive concepts, information that is not standardized and is created during a fabricating process may be standardized and reconfigured into a unit schedule. The unit schedule may be analyzed to detect abnormality of the equipment or to calculate the level of contribution about the quality of manufactured goods, thereby improving the productivity.

Each of the plurality of equipment 300-1 through 300-m may contain one or more processors. The one or more processors may be configured to carry out instructions of a computer program by performing the basic arithmetical, logical, and input/output operations of the system. The one or more processors may include a single-core processor, a dual-core processor, a triple-core processor, a quad-core processor, one or more digital signal processors (DSPs), application-specific-integrated-circuits, field programmable gate arrays (FPGAs) and/or the like. The one or more processors may perform a variety of functions for the equipment 300 and may process data by executing program code, one or more software modules, firmware, middleware, microcode, hardware description languages, and/or any other like set of instructions stored in the one or more memory devices. The program code may be provided to the one or more processors by the one or more memory devices, one or more drive mechanisms (not shown), and/or via a network. In order to perform the variety of functions and data processing operations according to the example embodiments delineated herein, the program code and/or software components are loaded into the one or more processors. Once the program code is loaded into the one or more processors, the one or more processors may be programmed to perform the various operations and functions delineated by the program code, thereby transforming the one or more processors into a special purpose processor.

Each of the plurality of equipment 300-1 through 300-m may also include a transmitter and receiver. The transmitter and receiver may be any type of hardware device that generates or otherwise produces radio waves in order to communicate with one or more other devices. The transmitter and receiver may be coupled with an antenna (not shown) in order to transmit data to one or more other devices. The transmitter and receiver may be configured to receive digital data from one or more components of the equipment 300, and convert the received digital data into an analog signal for transmission over an air interface. The transmitter and receiver may be any type of hardware device that can receive and convert a signal from a modulated radio wave into usable information, such as digital data. The transmitter and receiver may be coupled with the antenna (not shown) in order to capture radio waves. The transmitter and receiver may be configured to send digital data converted from a captured radio wave to one or more other components of the equipment 300. The equipment 300 may include a transceiver (not shown) instead of transmitter and receiver, where the transceiver is a single component configured to provide the functionality of a transmitter and a receiver as discussed above. The wireless transmitter/receiver and/or transceiver may be configured to operate in accordance with one or more wireless communications protocols and/or one or more cellular phone communications protocols. Caller party terminal 10 and/or called party terminal may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, Long Term Evolution (LTE), an email protocol such as Internet Message Access Protocol (IMAP) and/or Post Office Protocol (POP), an instance messaging such as eXtensible Messaging and Presence Protocol (XMPP), Session Initiation Protocol for Instant Messaging and Presence Leveraging Extensions (SIMPLE), Instant Messaging and Presence Service (IMPS), and Short Message Service (SMS), or any other "wireless" communication protocols, including RF-based, optical (visible/invisible), and so forth.

Figure 2:
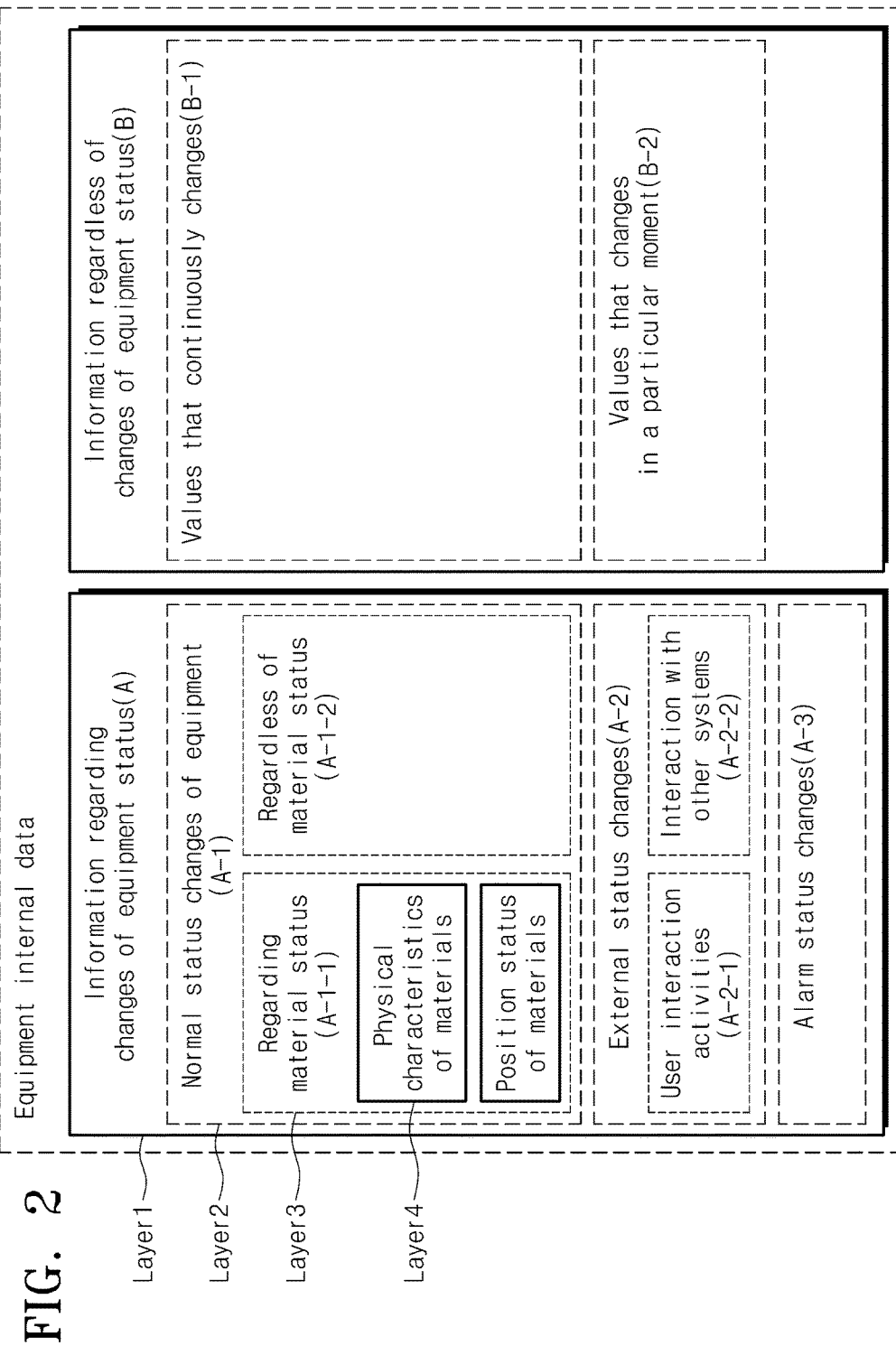
FIG. 2 is a diagram showing equipment information according to an example embodiment of the inventive concepts.

FIG. 2 is a diagram showing equipment information according to an embodiment of the inventive concepts. According to an embodiment of the inventive concepts, all information that equipment 300 is involved in or can be measured by the equipment 300 may be classified depending on the mutually exclusive and collectively exhaustive (MECE) principle. MECE is a principle or rule for separating or otherwise grouping a set of items into sets or subsets, where the choice of sets or subsets should be mutually exclusive and collectively exhaustive. Sets or subsets that are mutually exclusive are sets or subsets that cannot include the same elements and/or items, and/or the sets or subsets may not occur at the same time. Sets or subsets are collectively exhaustive if one of the sets/subsets is required to occur or exist. Thus, categories classified at the same layer are not overlapped, and all information associated with a fabricating process may be acquired. Below, a way of classifying information according to an example embodiment of the inventive concepts will be described with regard to FIG. 2.

Equipment information is divided into information A associated with a change in an equipment status and information B not associated with the equipment status (Layer 1).

The information A associated with a change in an equipment status is classified into information A-1 indicating a normal status change of the equipment 300, information A-2 generated in conjunction with an outside device associated with the equipment 300, and information A-3 that is generated due to abnormality of the equipment 300 (Layer 2).

The information A-1 may include all information that the equipment 300 can create during a fabricating process. The information A-1 may include a status change of material (e.g., wafer, glass, etc.) needed for the fabricating process and additional equipment information needed for the fabricating process. The information A-1 is partitioned into information A-1-1 that indicates a material status and information A-1-2, which is not associated with the material status information A-1-1 (Layer 3).

The information A-1-1 is divided into information associated with a physical/chemical characteristic of the material and information associated with the material status (Layer 4).

The information A-1-2 (i.e., the information not associated with the material status) may include all information that is not directly associated with the fabricating process but is associated with equipment operations enabling the material to be processed by the equipment 300. For example, the information A-1-2 may include a transfer operation, a chamber opening/closing operation conducted in the equipment 300, and/or other like operations associated with the equipment 300.

The information A-2 (i.e., information generated in conjunction with an outside device associated with the equipment 300) may include user and/or operator behavior of working and/or operating the equipment 300, information created during communications between the equipment 300 and an external device and/or external system associated with management of the equipment 300 and/or an equipment line to which the equipment 300 belongs. The information A-2 is divided into information A-2-1 about user interaction activities and information A-2-2 about interaction with other systems (Layer 3).

The information A-2-1 (i.e., the information about user interaction activities) may include all information regarding user interactions created when a user operates the equipment 300 through a user interface. User interaction information may include a change in a process condition and/or process management. The information A-2-2 (i.e., the information about interaction with other devices and/or systems) may include information created due to an interface with an external system such as Manufacturing Execution System (MES). For example, the information A-2-2 may include information associated with process automation and/or information associated with a yield of equipment 300 and/or a yield of an external device.

The information A-3 (i.e., the information generated due to abnormality of the equipment 300) may include all information generated while the equipment works and/or information associated with the abnormality of the equipment during interfacing with an outside device and/or system associated with the equipment 300.

The information B, which is not associated with the equipment status information, is divided into information B-1 and information B-2. The information B-1 is associated with values that continuously change and information B-2 is associated with values that change in a particular moment (Layer 2).

According to various example embodiments of the inventive concepts, equipment information collected from the plurality of equipment 300 may be (re)configured into a unit schedule according to the information classifications as described above. The unit schedule may be a schedule or other like organization system that is used to arrange or otherwise organize a plurality of processes executed by the equipment 300. The unit schedule may be analyzed to detect abnormality of the equipment 300 and/or calculate the level of contribution about the quality of manufactured goods, thereby improving the productivity.

Figure 3:
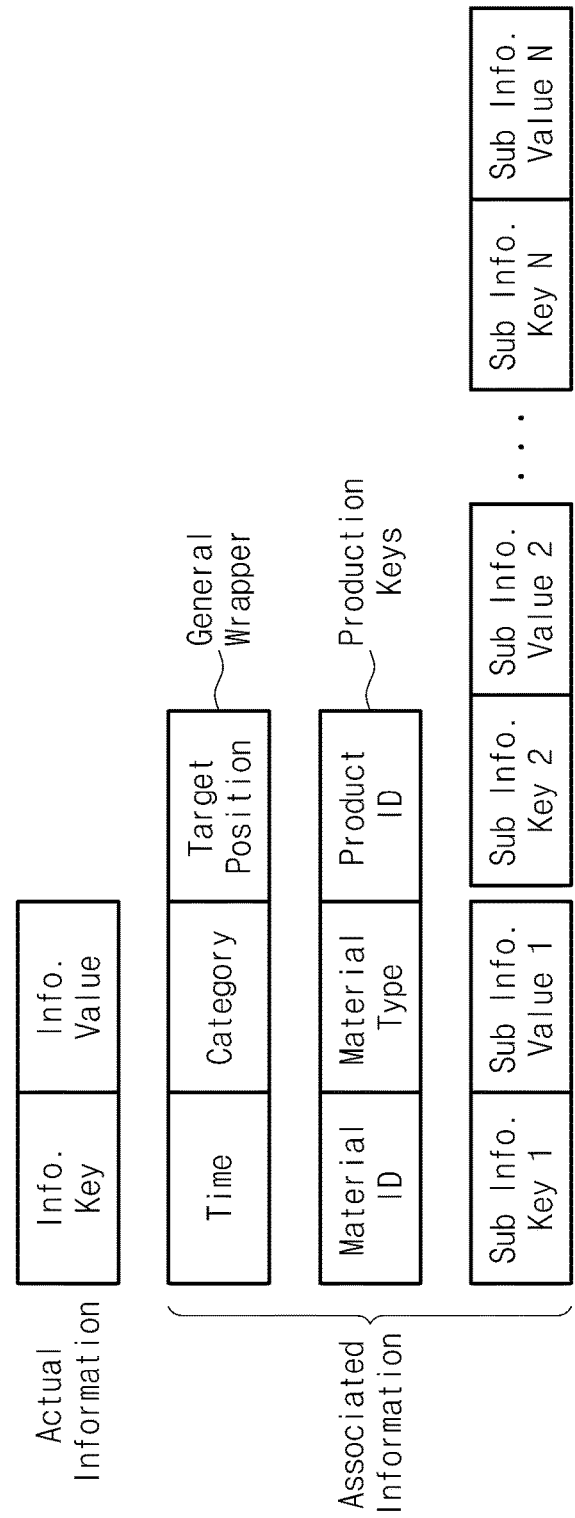
FIG. 3 is a diagram showing the format of information stored in the equipment, according to an example embodiment of the inventive concepts.

FIG. 3 is a diagram showing the format of information stored in the equipment, according to an example embodiment of the inventive concepts. According to various embodiments, information is collected in the form of a key-value pair from a plurality of equipment 300 during a fabricating process, as available information. Also, the collected information includes a time when information is created, classification codes, and/or generation positions. In addition, the collected information includes information about equipment-used materials, equipment-fabricated products, and a reserved area for collecting additional information.

The standardization format according to an example embodiment of the inventive concepts is illustrated in FIG. 3. Information collected from a plurality of equipment 300 may include practical information. The practical information may include a key denoting which information is to be recorded and a value of the key. The associated information may include information associated with the practical information, information associated with a target material corresponding to the practical information, and/or any additional information associated with the practical information. However, the inventive concepts are not limited thereto. For example, all information other than the practical information may be classified depending on a variety of standards.

The information (i.e., general wrapper) associated with the practical information may include a time when the practical information is created, a category of the practical information in compliance with the classifications described with regard to FIG. 2, and/or specific hardware (target position) of the equipment 300 that creates the practical information.

The information (i.e., production key) associated with the target material may include a target material information (material ID) associated with the practical information, classification information (material type) of the target material information associated with the practical information, and/or production information (production ID) including the target material information associated with the practical information.

The additional information (i.e., sub-information) may include subsidiary information other than the above-described information.

A name of a file in which equipment information created from the plurality of equipment 300 is stored. The stored information may have a regular and/or standardized format for collection and analysis by an external device. For example, a name of a file where equipment information is stored may include a classification information (i.e., Layer #), a category (i.e., Prefix) in a corresponding layer, information generation point in time (i.e., Timestamp), and file index (#fileIndex). In various embodiments, the file index may denote a file order for storing a file that is different from a storing the file by a time unit. For example, a file may be generated based on a text: [Layer #2 Prefix][Timestamp] (_#FileIndex).txt. Detailed equipment information belonging to a lower layer may be stored in a corresponding file.

According to the above-described standardization format, a variety of information created during a fabricating process may be stored in the equipment 300. The stored information may be collected by at least one of the application servers 200-1 through 200-n (as discussed previously with regard to FIG. 1) and used as data for various analysis.

Figure 4:
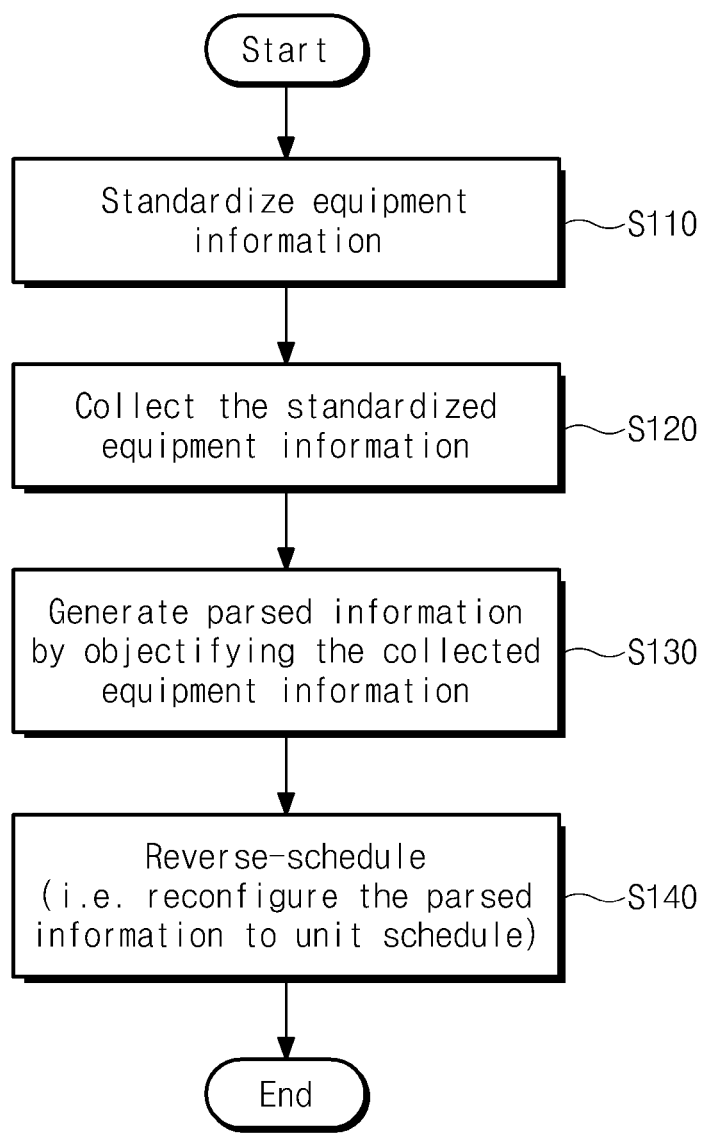
FIG. 4 is a flow chart showing a method of processing equipment information from a plurality of equipment at a fabricating process, according to an example embodiment of the inventive concepts.

FIG. 4 is a flow chart showing a method of processing equipment information from a plurality of equipment at a fabricating process, according to an example embodiment of the inventive concepts. The operations of the method of processing equipment information will be described as being performed by the application server 200-1 as described previously with regard to FIG. 1. However, it should be noted that any other device that is the same or similar to the application servers 200 could also perform the method of processing equipment information as shown in FIG. 4.

In operation S110, the application server 200-1 standardizes the equipment information. A variety of information created during the fabricating process may be standardized according to the standardized format shown in FIG. 2. The standardization may be performed in each of the plurality of equipment 300, and standardized equipment information may be stored in a separate storage device in the equipment 300. However, the inventive concepts are not limited thereto. For example, standardized equipment information may be stored in an external storage device associated with one or more of the plurality of equipment 300.

In operation S120, the application server 200-1 collects the standardized equipment information. For example, application servers 200-1 through 200-n may collect equipment information in a dispersive way by considering the amount of information that each of the plurality of equipment 300 creates. The standardized equipment information may be stored in storage devices included in or associated with the application servers 200-1 through 200-n.

In operation S130, the application server 200-1 generates analysis information by objectifying the collected equipment information. Because the collected equipment information would not be directly used as analysis data, the collected equipment information is objectified in order to conduct various analyses. The term "objectifying" may refer to a process of converting, translating, or otherwise configuring the collected equipment information into data objects, such as variables, data structures, functions, and/or any other like class-based elements. Thus, the application servers 200-1 through 200-n analyze the collected equipment information and objectify the analyzed information.

In operation S140, the application server 200-1 generates a reverse schedule. The reverse schedule may denote to reconfigure the analysis information created in operation S130 into a unit schedule. The unit schedule indicates a combination of discrete hardware operations conducted by the equipment 300. The unit schedule may include information indicating hardware in specified ones of the equipment 300 that are used to fabricate a product. If a defective product is detected, any one of the equipment 300 and/or specific hardware of any of the equipment 300 causing the defective product may be detected by analyzing the unit schedule and/or comparing each of a plurality of unit schedules.

Figure 5:
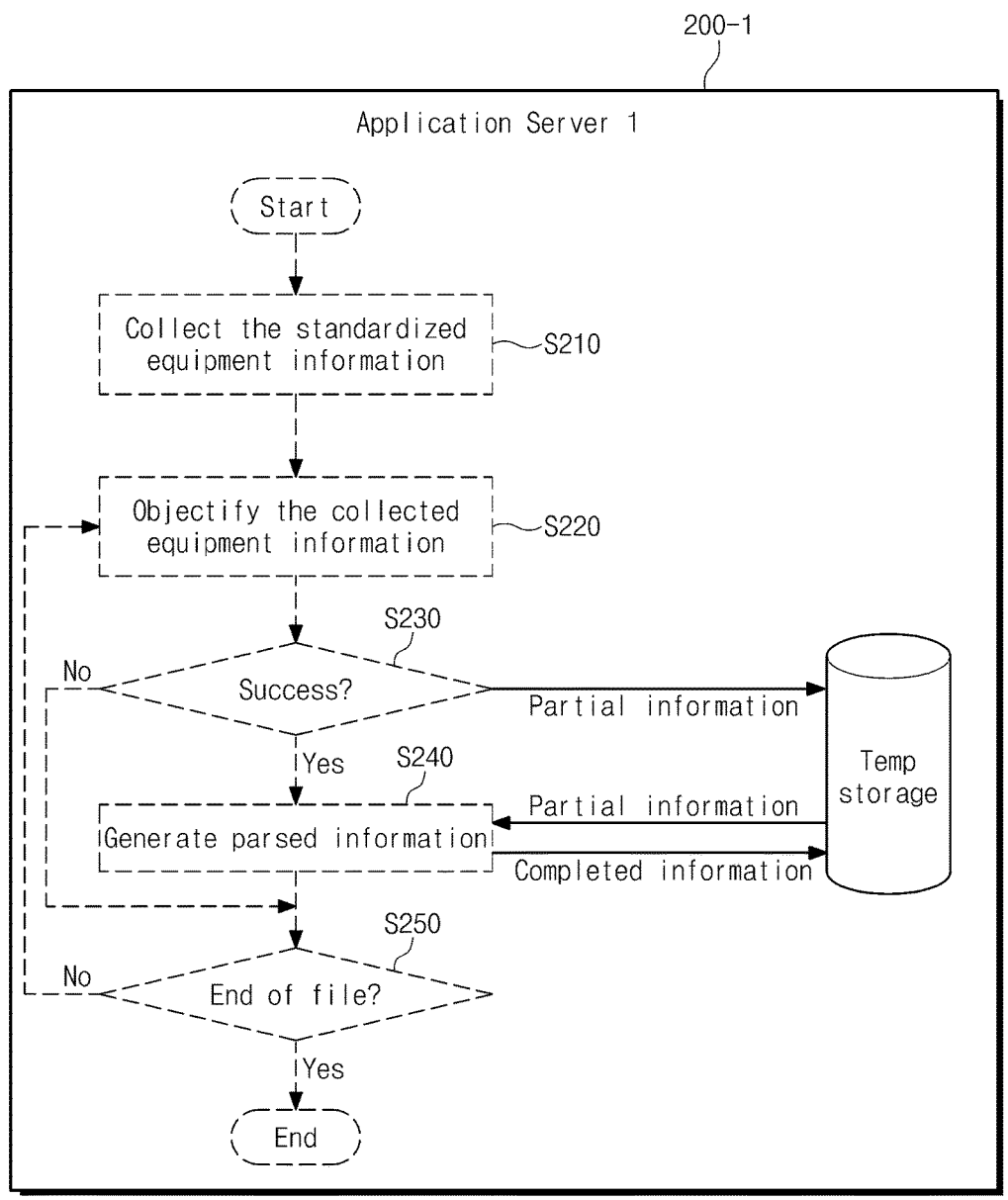
FIG. 5 is a detailed flow chart of step S130 shown in FIG. 4, according to an example embodiment of the inventive concepts.

FIG. 5 is a detailed flow chart of step S130 shown in FIG. 4, according to an example embodiment of the inventive concepts.

As shown in operation S210, the application server 200-1 collects the standardized equipment information. The collection is made in the same or similar manner as described with reference to FIG. 4, and a description thereof is omitted.

In operation S220, the application server 200-1 objectifies the collected equipment information. According to various embodiments, the collected equipment information is objectified because the collected equipment information may not be directly used as analysis data. For example, the objectification may include organizing the collected equipment information in a table according to a variety of classifications of the collected equipment information.

In operation S230, the application server 200-1 determines whether the objectification is successful. As a consequence of determining that the objectification is successful (i.e., the objectified information corresponds to the standardized format shown in FIG. 3 and partial information is not omitted), the application server 200-1 proceeds to operation S240 to generate parsed analysis information. At this time, the objectified information may be stored in temporary storage in the form of partial information. As a consequence of determining that the objectification is not successful, the application server 200-1 proceeds to operation S250 to determine whether recently objectified information is an end of the file.

In operation S240, the application server 200-1 generates parsed analysis information. The analysis information may be created based on partial information generated through iteration of loops shown in FIG. 5. The analysis information that is created by repeating an operation of gathering the partial information (i.e., through iteration of loops) is stored in the temporary storage as new partial information.

In operation S250, the application server 200-1 determines whether recently objectified information is an end of the file. After a variety of equipment information included in one file is objectified, the system determines whether objectification about all equipment information is completed. As a consequence of determining that objectification about all equipment information is completed, the method may end. As a consequence of determining that objectification about all equipment information is not completed, the application server 200-1 proceeds to back to operation S220 to continue to perform the objectification operation.

Figure 6:
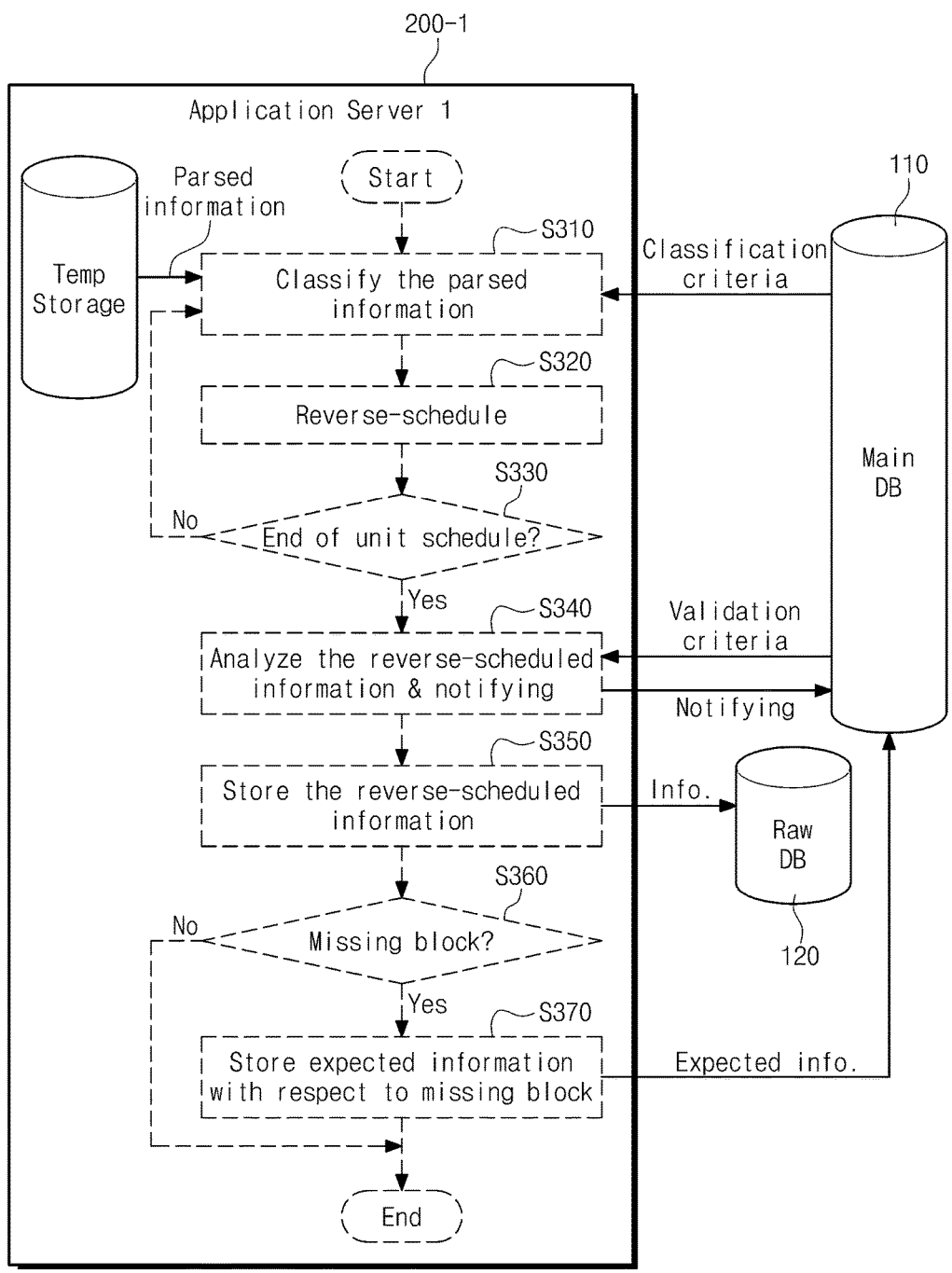
FIG. 6 is a detailed flow chart of step S140 shown in FIG. 4, according to an example embodiment of the inventive concepts.

FIG. 6 is a detailed flow chart of operation S140 shown in FIG. 4, according to an example embodiment of the inventive concepts.

In operation S310, the application server 200-1 classifies the parsed analysis information. The analysis information may be classified by means of an information classification table shown in FIG. 2. The information classification table shown in FIG. 2 may be stored in main database (DB) 110 of a main server 100 (refer to FIG. 1) in advance and may be loaded from the main DB 110 to classify the analysis information.

In operation S320, the application server 200-1 generates a reverse schedule. A reverse schedule is a procedure of reconfiguring the analysis information stored in a temporary storage of the application server 200-1 into a unit schedule. A unit schedule generated through the reverse schedule is stored in the main DB 110 and is used to perform various analysis operations. The classified analysis information may be reconfigured into a unit schedule being a combination of discrete hardware operations that are conducted in the equipment. The unit schedule may include information indicating hardware in specific equipment used to fabricate the final product. If a defective product is detected, any equipment 300 and/or specific hardware components of any of the equipment 300 causing the defective product may be detected by analyzing the unit schedule and/or comparing different unit schedules.

In operation S330, the application server 200-1 determines whether the reverse schedule is executed with respect to all unit schedules. As a consequence of determining that the reverse schedule is executed with respect to all unit schedules, the application server 200-1 proceeds to operation S340 to analyze the reverse-scheduled information. As a consequence of determining that the reverse schedule is not executed with respect to all unit schedules, the application server 200-1 proceeds to step S310 to classify the parsed analysis information.

In step S340, the application server 200-1 analyzes the reverse-scheduled information. Whether corresponding data is within an allowable and/or acceptable value may be determined based on a variety of data included in the unit schedule. The allowable and/or acceptable value may be based on one or more design choices and/or determined based on empirical studies. At this time, the validation criteria may be obtained from the main DB 110 and may be used as data for determining a defective product and/or an abnormality of the equipment 300.

In operation S350, the reverse-scheduled information is stored. The reverse-scheduled information may be stored in one or more raw DBs 120 of the main server 100.

In step S360, whether a missing block exists is determined. The unit schedule may denote a combination of discrete hardware operations that are conducted in the equipment. The unit schedule may include a plurality of hardware operations: carrying a wafer, inserting a wafer into a chamber, and returning the wafer. Since a plurality of chambers is provided in the equipment, the product (or, material) may pass through various paths. In this step, whether a discrete hardware operation (i.e., missing block) omitted during a data collecting operation exists is determined. If the missing block exists, the method proceeds to step S370. If no missing block exists, the method may end.

In operation S370, expected information about the missing block is stored. The expected information may be sent to the main DB 110 and may be used to perform various analysis operations.

The reverse-scheduled information according to various example embodiments of the inventive concepts may be used to search for an abnormality of the equipment 300 and/or search for an optimal path in manufacturing the product. A scheduler (e.g., a control program) of the equipment may efficiently distribute and manage work by means of the reverse-scheduled information, thereby improving the productivity and detecting abnormality of the equipment 300.

Figure 7:
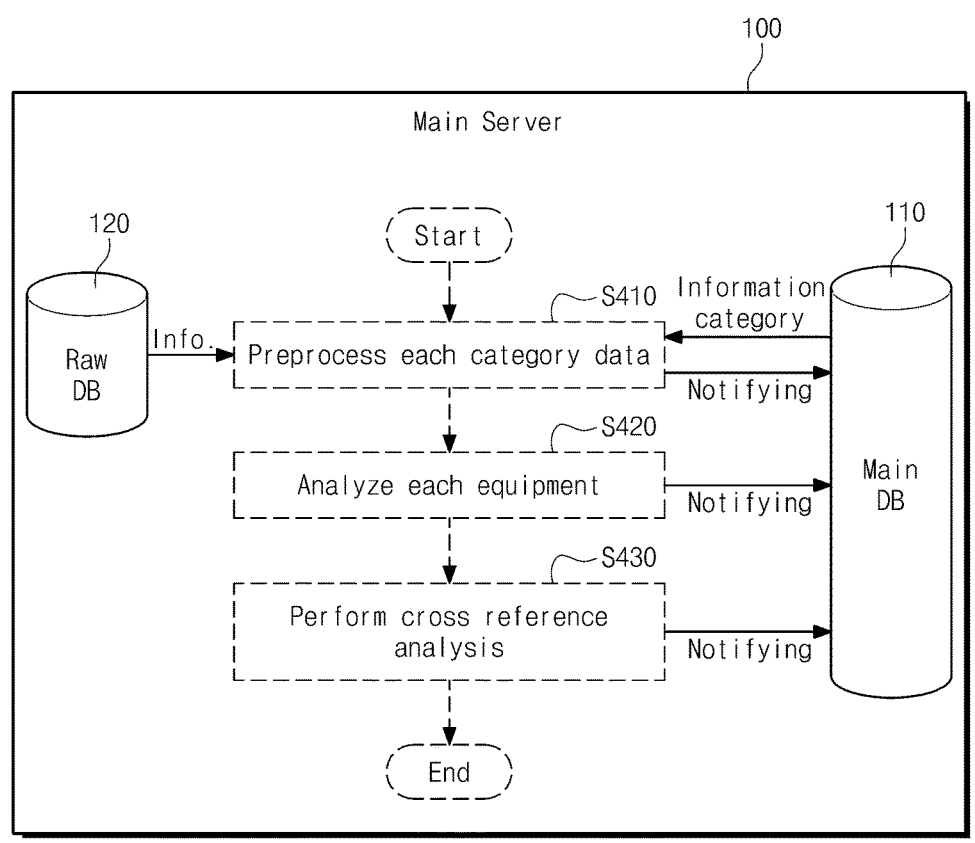
FIG. 7 is a flow chart showing a method of analyzing reverse-scheduled information, according to an example embodiment of the inventive concepts.

FIG. 7 is a flow chart showing a method of analyzing reverse-scheduled information, according to an example embodiment of the inventive concepts. The operations of the method of processing equipment information will be described as being performed by the main server 100 as described previously with regard to FIG. 1. However, it should be noted that any other device that is the same or similar to the main server 100 could also perform the method of analyzing reverse-scheduled information as shown in FIG. 7.

In operation S410, the main server 100 preprocesses the category data. Reverse-scheduled information may be used to process additional statistical information based on a time or period during which the analysis information is created. The additional statistical information may be created depending on production information classification provided from a host and an information classification table as shown in FIG. 2. The additional statistical information is stored in main DB 110 and may be used to provide validation criteria as discussed with regard to FIG. 6.

In operation S420, the main server 100 analyzes each of a plurality of equipment 300. The reverse-scheduled information is used to analyze each of the plurality of equipment 300. A unit schedule reconfigured according to the information classification table may be used to find abnormality of the equipment 300 and/or management advantages. For example, the unit schedule may be used to determine whether a temperature of a chamber in the equipment 300 is within a reference temperature range or desired temperature range. In various embodiments, unit schedules are compared to one another to find peculiarities, and a resultant value based on the peculiarities may be used for analysis. For example, specific data of any unit schedule may stand out markedly when compared with a distribution of data of any other unit schedules. This may mean that any hardware of the equipment is abnormal. The analysis result may be stored in the main DB 110.

In operation S430, the main server 100 performs a cross reference analysis. The abnormality of the equipment 300 and/or management advantages may be found by comparing the reverse-scheduled information of each of the plurality of equipment 300. The analysis result may be stored in the main DB 110.

According to an example embodiment of the inventive concepts, a variety of information generated during a fabricating process may be standardized for reconfiguration into a unit schedule. The unit schedule may be used to detect abnormality of the equipment or for a scheduler to distribute works efficiently, thereby improving the productivity.

While the inventive concepts have been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A method of processing equipment information obtained from a plurality of equipments, the method comprising:
   obtaining, by a processor, equipment information from the plurality of equipments;
   standardizing, by the processor, the equipment information such that the standardized equipment information conforms to a desired format, the standardizing including generating practical information and associated information based on the equipment information, the practical information indicating an operation state of each of the plurality of equipments, the associated information being information about the practical information;
   aggregating, by the processor, the standardized equipment information, the aggregating being based on a prediction of an amount of equipment information to be produced during a desired period of time;
   objectifying, by the processor, the aggregated standardized equipment information to generate analysis information;
   performing a reverse schedule operation to reconfigure the analysis information into a unit schedule based on an information classification table, the information classification table including data classifying information included in the standardized equipment information; and
   detecting abnormality of each of the plurality of equipments based on the unit schedule,
   wherein the plurality of equipments include a plurality of hardware, each of which is configured to carry a wafer, open and close a chamber included therein, and/or insert the wafer to and take the wafer out from the chamber, and
   the plurality of equipments are connected to the processor through a communication network.

2. The method of claim 1, wherein
   the equipment information comprises (i) information associated with status changes in each of the plurality of equipments, and (ii) information not associated with the status changes, and
   the information associated with status changes in each of the plurality of equipments includes at least one of information associated with management of each of the plurality of equipments, information generated in conjunction with an outside of the plurality of equipments, and information generated due to at least one defective equipment from among the plurality of equipments.

3. The method of claim 2, wherein the equipment information is classified within the information classification table according to a Mutually Exclusive and Collectively Exhaustive (MECE) rule such that each element of the information classification table is mutually exclusive and collectively exhaustive from each other element in the information classification table.

4. The method of claim 2, wherein the practical information comprises (i) information to be recorded according to the information classification table, and (ii) a value of the information to be recorded.

5. The method of claim 4, wherein the associated information comprises at least one of (i) information associated with generation of the practical information, (ii) information associated with a target material described by the practical information, and (iii) additional information associated with the practical information.

6. The method of claim 5, wherein the standardized equipment information comprises at least one of (i) information associated with a category defined by the information classification table, and (ii) information associated with a point in time at which the standardized equipment information is generated.

7. The method of claim 2, further comprising:
   storing the standardized equipment information in a storage device associated of a corresponding one of the plurality of equipments before collecting the standardized equipment information, and each storage device being accessible from an external device through a network.

8. The method of claim 2, wherein the objectifying comprises:
   determining whether the aggregated standardized equipment information corresponds to the desired format;
   storing the aggregated standardized equipment information in a temporary storage device in as partial information in response to the aggregated standardized equipment information being determined to correspond to the desired format; and
   storing the analysis information generated by gathering the partial information in the temporary storage device.

9. The method of claim 2, wherein the performing a reverse schedule operation comprises:
   classifying the analysis information according to the information classification table;
   configuring the classified analysis information into the unit schedule; and
   determining whether a missing block exists within the unit schedule by comparing the configured classified analysis information with other unit schedules.

10. The method of claim 9, further comprising:
    generating expected information associated with the missing block in response to the missing block being determined to exist.

11. A system comprising:
    a processor of one of a plurality of application servers configured to standardize equipment information collected from a plurality of equipments such that the standardized equipment information conforms to a desired format, the standardized equipment information including practical information and associated information, the practical information indicating an operation state of each of the plurality of equipments, the associated information being information about the practical information;
    a main server configured to,
      obtain fundamental information of each of the plurality of equipments, fundamental information including identification information used to identify each of the plurality of equipments, the main server obtaining the fundamental information from a host device, and
      calculate a prediction of an amount of the equipment information to be produced during a desired period of time; and
    at least one application server of the plurality of application servers configured to,
      collect the standardized equipment information through a network based on the prediction of the amount of the standardized equipment information to be produced during a period of time, objectify the collected equipment information to generate analysis information, perform a reverse schedule operation for configuring the analysis information into a unit schedule based on an information classification table, the information classification table including data classifying information included in the standardized equipment information, and detecting abnormality of each of the plurality of equipments based on the unit schedule, wherein the plurality of equipments include a plurality of hardware, each of which is configured to carry a wafer, open and close a chamber included therein, and/or insert the wafer to and take the wafer out from the chamber, and the plurality of equipments are connected to the processor through a communication network.

12. The system of claim 11, wherein the equipment information comprises (i) information associated with a status change in the plurality of equipments, and (ii) information not associated with the status changes, and the information associated with the status change in the plurality of equipments comprises at least one of (i) information associated with management of the plurality of equipments, (ii) information generated through conjunction with an outside of the plurality of equipments, and (iii) information generated due to at least one defective equipment of the plurality of equipments.

13. The system of claim 12, wherein the main server is configured to:

store, in a storage device associated with the main server, the information classification table and the analysis information configured by performing the reverse schedule operation.

14. The system of claim 13, wherein the practical information comprises information to be recorded based on the information classification table and a value of the information to be recorded.

15. The system of claim 14, wherein the associated information comprises at least one of (i) information associated with generation of the practical information, (ii) information associated with a target material corresponding to the practical information, and (iii) additional information associated with the practical information.

16. A server, comprising:

a non-transitory computer readable medium configured to store program code; and a processor configured to execute the program code to, obtain equipment information from a plurality of equipments;

standardize the equipment information such that the standardized equipment information conforms to a desired format, the standardized equipment information including practical information and associated information based on the standardized equipment information, the practical information indicating an operation state of each of the plurality of equipments, the associated information being information about the practical information;

aggregate the standardized equipment information based on a prediction of an amount of standardized equipment information to be produced during a desired period of time;

generate analysis information based on the aggregated standardized equipment information;

reconfigure the analysis information into a unit schedule based on an information classification table, the information classification table including data classifying information included in the standardized equipment information; and detect abnormality of each of the plurality of equipments based on the unit schedule, wherein the plurality of equipments include a plurality of hardware, each of which is configured to carry a wafer, open and close a chamber included therein, and/or insert the wafer to and take the wafer out from the chamber, and the plurality of equipments are connected to the processor through a communication network.

17. The server of claim 16, wherein the equipment information comprises (i) information associated with status changes in each of the plurality of equipments, and (ii) information not associated with the status changes, and the information associated with status changes in each of the plurality of equipments includes at least one of information associated with management of each of the plurality of equipments, information generated in conjunction with an outside of the plurality of equipments, and information generated due to at least one defective equipment from among the plurality of equipments.

18. The server of claim 17, wherein the processor is further configured to execute the program code to:

store the standardized equipment information in another storage device associated of a corresponding one of the plurality of equipments before collecting the standardized equipment information, and each storage device is accessible by an external device through a network.

19. The server of claim 17, wherein in the generating analysis information, the processor is configured to execute the program code to:

determine whether the aggregated standardized equipment information corresponds to the desired format;

store the aggregated standardized equipment information in a temporary storage device as partial information in response to the equipment information is being determined to correspond to the desired format; and store the analysis information generated by gathering the partial information in the temporary storage device.

20. The server of claim 16, wherein the processor is configured to execute the program code to reconfigure the analysis information by:

classifying the analysis information according to the information classification table;

configuring the classified analysis information into the unit schedule; and determining whether a missing block exists within the unit schedule by comparing the configured classified analysis information with other unit schedules.

* * * * *